United States Patent [19]
Vanheerentals

[11] 3,901,598
[45] Aug. 26, 1975

[54] APPARATUS FOR EXPOSURE OF COLOR CALIBRATING FILM

[75] Inventor: Jacques Vanheerentals, Schoten, Belgium

[73] Assignee: Agfa-Gevaert AG, Leverkusen, Germany

[22] Filed: Apr. 26, 1974

[21] Appl. No.: 464,687

[30] Foreign Application Priority Data
Apr. 26, 1973 Germany.............................. 2321002

[52] U.S. Cl.................................. 355/71; 355/77
[51] Int. Cl.²......................................... G03B 27/76
[58] Field of Search............ 355/32, 35, 67, 71, 83, 355/80, 77

[56] References Cited
UNITED STATES PATENTS
| | | | |
|---|---|---|---|
| 2,053,317 | 9/1936 | Billing.................................... | 355/71 |
| 2,291,347 | 7/1942 | Ryan..................................... | 355/71 |
| 3,469,914 | 9/1969 | Thomson.......................... | 355/35 X |

Primary Examiner—Richard A. Wintercorn
Attorney, Agent, or Firm—Michael S. Striker

[57] ABSTRACT

An arrangement for exposure of a color calibrating film by means of a gray wedge, including a source of light, a first fixed gray wedge, a second moveable gray wedge mounted in overlapping relationship with the first one, and a photosensitive medium.

9 Claims, 4 Drawing Figures

APPARATUS FOR EXPOSURE OF COLOR CALIBRATING FILM

BACKGROUND OF THE INVENTION

The present invention concerns an apparatus for the exposure of a color calibrating film. More particularly, the exposure of the film is achieved by using two different colors, such as yellow and blue, exposed one after another by means of a gray wedge screen, in which the direction of the gradient of density is perpendicular to the direction of change of the hue, as determined by the incoming light.

It is already known to provide a variation in density of the gray wedge by means of a shutter, by means of devices which are well known in the art. The shutter provides for an exposure time over the width of the recording surface that varies continuously from 0 to 100 percent, corresponding to the maximum exposure point and exposure time. The shutter will open and close in one direction during the exposure of the first color, and move in the opposite direction during the exposure of the second color, so that at every point of the color calibrating film the total of both exposures corresponding to the two colors will add up to 100 percent. This well known method of exposure requires the use of an operational motor, which runs during the period of exposure, so that a highly stable and rigid construction of the exposure apparatus is necessary to prevent excessive vibrations from interfering with the exposure pattern. Such a complicated construction is only found inside a very complex reproduction camera, so that for the exposure of color calibrating films a special instrument is necessary.

SUMMARY OF THE INVENTION

It is an object of the invention to provide a calibrating film exposure apparatus which is so constructed that during the exposure no part of the apparatus is in motion.

Another object of the invention is to provide a novel and improved exposure control apparatus to overcome the disadvantages of the prior art in a relatively simple manner.

A further object of the invention is to provide an apparatus for the exposure of a two-color component test film which can be used in combination with an apparatus for controlling the exposure time during photographic printing of variable-contrast material.

It is another object of the invention to provide an arrangement for exposure of a color calibrating film by means of a gray wedge, comprising a source of two differently colored light beams; a first fixed gray wedge in the path of said beams, having a gradation pattern arranged in a first direction; a second movable gray wedge also in the path of said beams and in close proximity to said first gray wedge, having a gradation pattern arranged in a second direction; and a photosensitive medium in the path of said light beams, located behind said gray wedges so that a characteristic pattern is exposed on said medium.

Through the utilization of a second gray wedge, rotated through 90° relative to the first gray wedge in reference to the changing density, the desired gradations in the colored film portions over the intensity-controlled area are made possible. The second gray wedge must be rotated through 180° with reference to its initial position in the time interval between the exposure of the first color and the exposure of the second color. During the exposures, of course, there is no movement of the various parts of the exposure apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
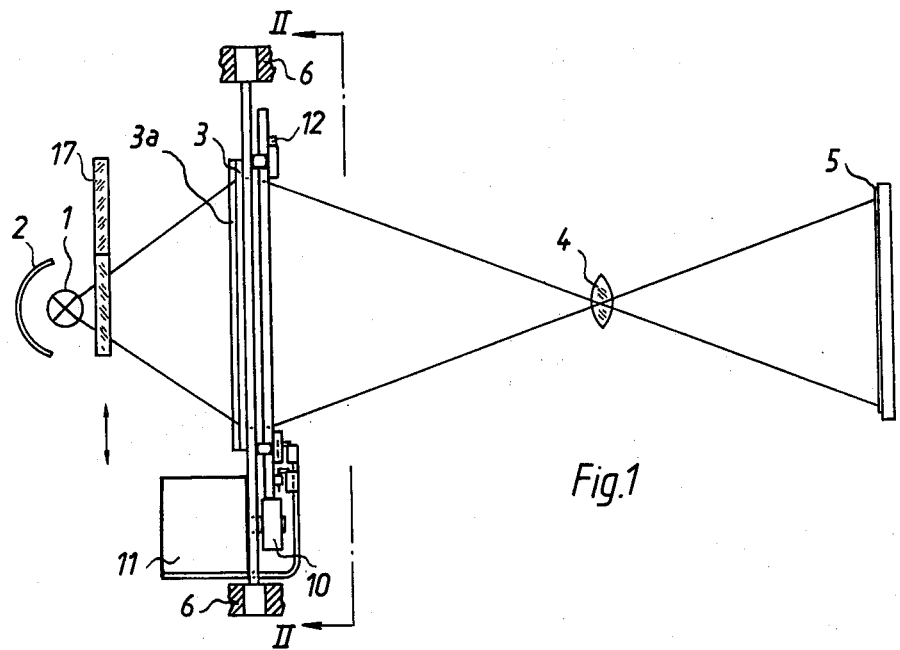
FIG. 1 shows the fundamental construction of a reproduction camera with the arrangement for exposure for a calibrating film according to the principles of the present invention.

FIG. 1 shows a light source 1 with a reflector 2 illuminating an original 3a, such as a negative or glass plate image, from which one desires to make a print or copy or enlargement. An objective or lens 4 focusses the light passing through the original 3a on the screen 5. The print or copier film is adhered to the screen surface 5 in a known manner.

The screen surface 5 is oriented in a direction perpendicular to the light beams passing through the original holding plate 3. The original holder 3 is fixed within the reproduction camera apparatus. A mounting plate 7 pivotable around bearings 6 includes a plurality of rollers 8 which engage the circumference or circular rim of a rotatable plate 9. The engagement between the rollers 8 and the plate 9 is by means of a friction facing or lining, or through an engaging member. The plate 9 is rotated by means of a pinion or a friction wheel arrangement 10, connected to a motor 11 through a step-down gear arrangement, or by other means serving to slow down the rotational speed. In opposite radial directions from the center or pivoting point of the rotatable plate 9 there are situated two positioning pins 12, 13, located 180° apart. The two pins 12, 13 are located at different radial distances from the center, so that the path of travel of the pins 12 and 13 includes the tripping switches 14 and 15, respectively. The switches 14 and 15 are fixedly secured to the mounting plate 7 and so aligned as to be engaged by the pins 12, 13, respectively when the plate 9 is rotated.

The operation is as follows: the motor 11 is activated by a starting switch (not shown), and turns in a clockwise direction until pin 12 hits switch 14. The motor now stops and its direction of rotation is reversed when the starting switch is again activated. After rotation in the counterclockwise direction for 180°, pin 13 will hit switch 15 and the motor will stop again. Thus the switches have two functions: to stop the motor, and to control its direction of rotation. The switches 14, 15 do not start the motor.

Figure 2:
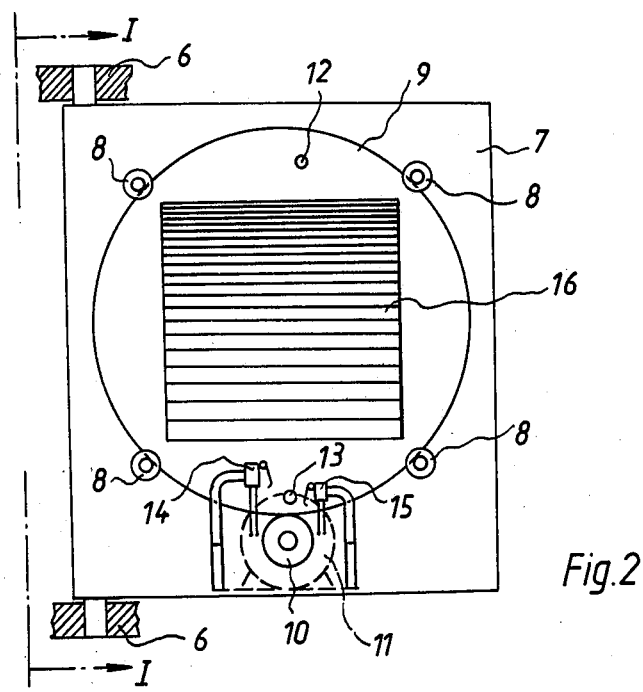
FIG. 2 is a front view of the arrangement for exposure of a calibrating film.

The plate 9 includes an approximately square cutout over which a gray wedge 16 is situated, the gray wedge having a transmissivity to light varying between 0 and 100 percent as depicted diagrammatically in FIG. 2. The gray wedge 16 in FIG. 2 is represented with the densest portion in the upper part of the Figure, corresponding to a transmissivity of 0 percent. The gray wedge 16 is situated on the plate 9 so that the lines or bands with the highest light transmissivity will correspond to the lines or bands with the least light transmissivity after a rotation of 180° around the center point. The position of the gray wedge 16 is indicated or marked on the original screen, so that a fixed gray wedge 18 with the gradations perpendicular to those in direction of the wedge 16 can be fixedly secured in the corresponding position.

Figure 3:
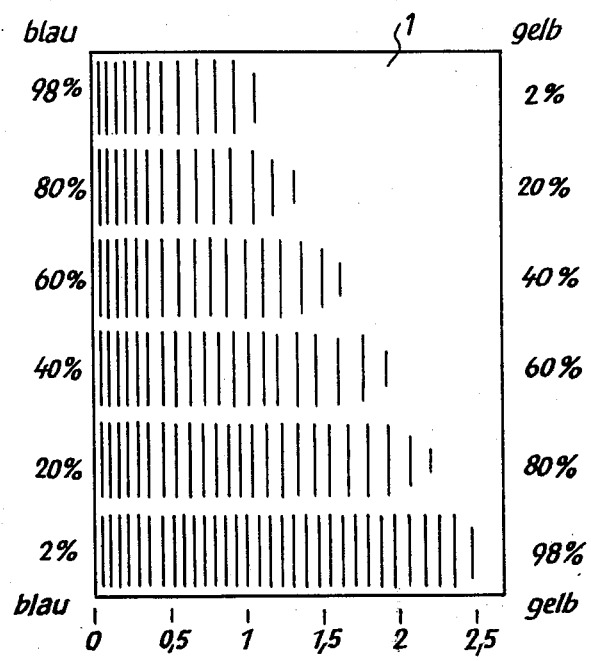
FIG. 3 is a diagrammatic representation of a calibrating test film exposed by use of the arrangement shown in FIGS. 1 and 2.

At the beginning of the operation, for example at the beginning of a new week, a new test exposure film will be placed on the surface 5. The film on the surface 5 must have nearly the same dimensions as the original 3 and the fixed gray wedge 18. The film on the surface 5 will first be exposed to one color, for example, yellow, with an intensity and exposure time so selected as to permit the point with greatest intensity to reach a maximum degree of darkness. Following this exposure the motor 11 will be activated through a starting contact, and the pin 13 will become disengaged from the switch 15. The motor 11 causes the rotation of the plate 9 and the corresponding gray wedge 16 in a clockwise direction, until the pin 12 reaches the switch 14, at which time the motor shuts down and the rotational direction of the motor for the next motion is reversed. At this time the gray wedge 16 is in a position in which it is displaced through 180° with respect to the first exposure. The points of least light intensity now correspond to the precision points of greatest light intensity. Following the exposure to yellow light, the exposure to blue light results in every point of the test film being 100 percent exposed. A test exposure film as seen in FIG. 3 will result.

The exposed film can then be inserted in a developing machine to produce a copy for use in an exposure control apparatus. During both exposures to the two colors an interchangeable filter 17 may be situated between the lamp 1 and the original 3. This filter 17 permits a relatively short exposure time. As test exposures are relatively rare the rotation of the second gray wedge 16 does not require the motor to reach the highest possible speed. After the withdrawal of the test film from the screen 5, the plate 7 can be rotated 90° with respect to its mounting 6 in the region between the plate 7 and the objective 4, so as to permit the full screen area 7 to be easily withdrawn from the path of the light beams, and so permit copying or printing to begin.

The second gray wedge 16 can be situated directly behind the first gray wedge 18; or adjacent to the original holder 3; or directly in front of the original 3a and the first gray wedge 18.

The resulting test film is utilized in an apparatus for controlling exposure of variable-contrast originals. In such an application it is necessary to have a calibrating film with a gray wedge image corresponding to one particular color, superimposed with a gray wedge image corresponding to a second color. Thus an entire range of different gradations in the two colors is possible on one calibrating film. Such a calibrating film can be used together with two screening emulsions, placed one on top of another, one sensitized for green and the other for blue, for example, in order to detect and manifest the different gradations. By a mixture of blue and yellow exposure light the different values of the gradation can be adjusted depending on the characteristics of the original used. For every original the maximum and minimum densities of exposure time can be based on the various ratios of the two colors manifesting themselves on the calibrating film. With the test film as seen in FIG. 3 it is possible to represent a row of calibrations along one edge of the film.

The technique according to the present invention may be utilized in connection with a contact copier apparatus, with the second gray wedge 16 situated between the light source and the first fixed gray wedge 18 and original holder 3, as closely as possible. Finally, the displacement of the second gray wedge 16 may be made by means of a rotation in the plane of the gray wedge, by means of the rotation of external attaching flaps through 180°, or by means of shifting of the wedge along its length.

Figure 4:
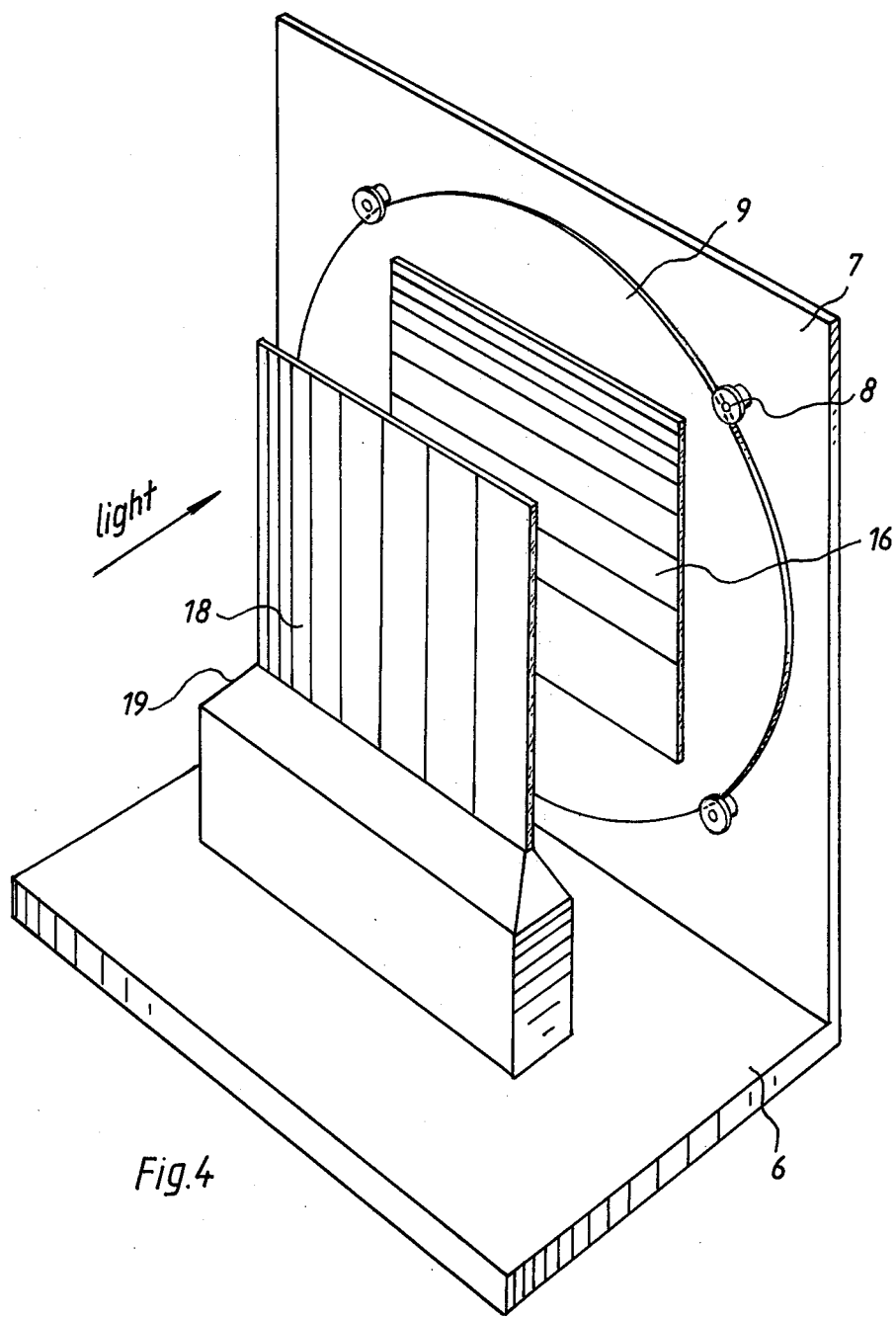
FIG. 4 is a perspective view of the arrangement, showing the relative position and orientation of the two gray wedges during one exposure.

FIG. 4 is a perspective view of the arrangement, showing the relative position and orientation of the two gray wedges during one exposure.

The first fixed gray wedge 18 is detachably secured to a mounting 19, and thereby secured to the support 6. The position of the gray wedge 18 is parallel to and overlapping with the second rotatable gray wedge 16. The light coming from the source 1 is directed to the two gray wedges as shown by the arrow already used for the light source.

It will be understood that each of the elements described above, or two or more together, may also find a useful application in other types of exposure arrangements differing from the types described above.

While the invention has been illustrated and described as embodied in an apparatus for exposure of color calibrating film, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for producing a calibrating image upon a test-exposure film specimen, comprising, in combination, holding means for holding in a predetermined plane a test-exposure film specimen upon which the calibrating image is to be formed; a first density wedge and a second density wedge each having a density which varies from approximately 0 percent to approximately 100 percent; mounting means mounting said density wedges for relative movement between a first stationary relative orientation in which the density of said first wedge increases along a first predetermined direction and the density of said second wedge increases along a second predetermined direction transverse to said first direction, and a second stationary relative orientation in which the density of said first wedge increases along said first predetermined direction and the density of said second wedge increases along a third predetermined direction opposite to said second direction; image-forming means operable when said wedges have said first stationary relative orientation for passing light of a first color through said wedges to form superimposed images of said wedges upon a test-exposure film specimen held in said plane, and operable when said wedges have said second stationary relative orientation for passing light of a different second color through said wedges to form superimposed images of said wedges upon such test-exposure film specimen; and drive means operable during a changeover of said image-forming means from said first to said second operating mode for effecting relative movement between said wedges from said first to said second relative orientation.

2. An arrangement as defined in claim 1, wherein said second wedge is movably mounted, and wherein said first and second stationary relative orientations are such that upon a change from one to the other the 0 percent density portion of said second wedge moves to the location previously occupied by the 100 percent density portion thereof while the 100 percent density portion of said second wedge moves to the location previously occupied by the 0 percent density protion thereof.

3. An arrangment as defined in claim 2, wherein said second wedge is planar and is mounted for rotation about an axis normal to the plane of said second wedge.

4. An arrangement as defined in claim 2, wherein said second wedge is mounted for tilting movement.

5. An arrangement as defined in claim 2, wherein said second wedge is planar and is mounted on a support plate which is mounted for rotation about an axis normal to the plane of said second wedge and of said support plate, and wherein said drive means comprises a drive motor and forcetransmitting means engaging the rim of said support plate and operative for effecting rotation of said support plate upon a changeover from one to the other of said operating modes of said image-forming means.

6. An arrangement as defined in claim 5, wherein said drive means includes first stop means comprised of a moving part on said support plate and a stationary part and second stop means likewise comprised of a moving part and a stationary part, said parts of said first stop means being so positioned as to engage when said wedges assume said first stationary relative orientation, and said parts of said second stop means being so positioned as to engage when said wedges assume said second stationary relative orientation.

7. An arrangement as defined in claim 2, wherein said drive means includes a drive motor connected to said second wedge for moving the latter from a first to a second position respectively corresponding to said first and second stationary relative orientations, and motor control means operative for stopping movement of said second wedge when said second wedge arrives at either one of said first and second positions.

8. An arrangement as defined in claim 2, wherein said drive means includes a drive motor connected to said second wedge for moving the latter from a first to a second position respectively corresponding to said first and second stationary relative orientations, and motor control means operative for effecting reversal of the direction of movement of said second wedge in response to arrival by said second wedge at either one of said first and second positions.

9. An arrangement as defined in claim 3, the arrangement being provided in a reproduction camera provided with holding means for holding an original to be copied in a predetermined original plane and wherein said second wedge is located at least approximately in said original plane in both said stationary relative orientations but is mounted for swinging movement to swing out of the path of the light of said image-forming means, for normal use of the reproduction camera.

* * * * *